Jan. 17, 1939.  J. M. WALL  2,144,277
INTERMITTENT FILM FEEDING MECHANISM
Filed July 11, 1935    2 Sheets—Sheet 1
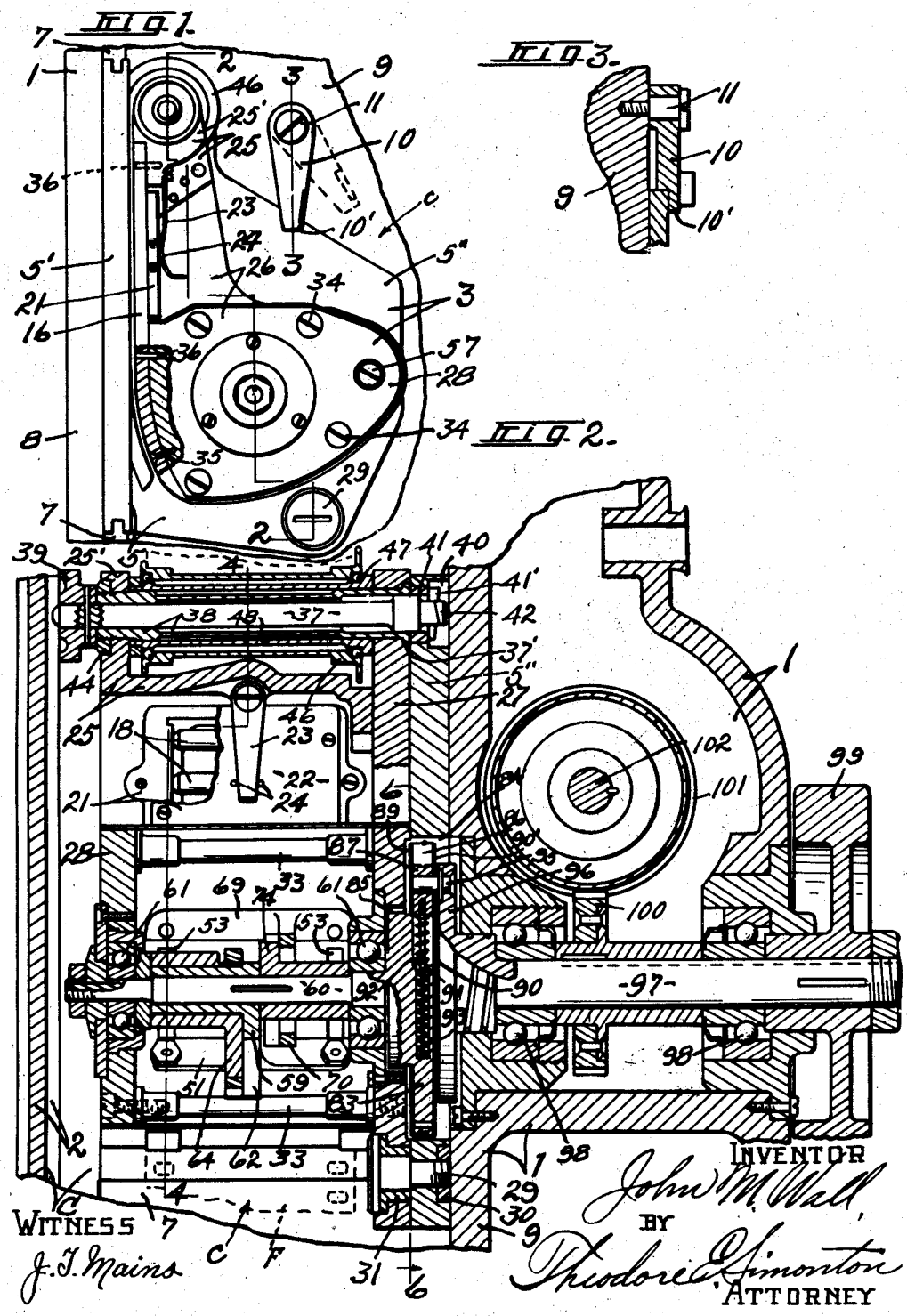
INVENTOR
John M. Wall
BY
Theodore Simonton
ATTORNEY
WITNESS
J. J. Mains Patented Jan. 17, 1939

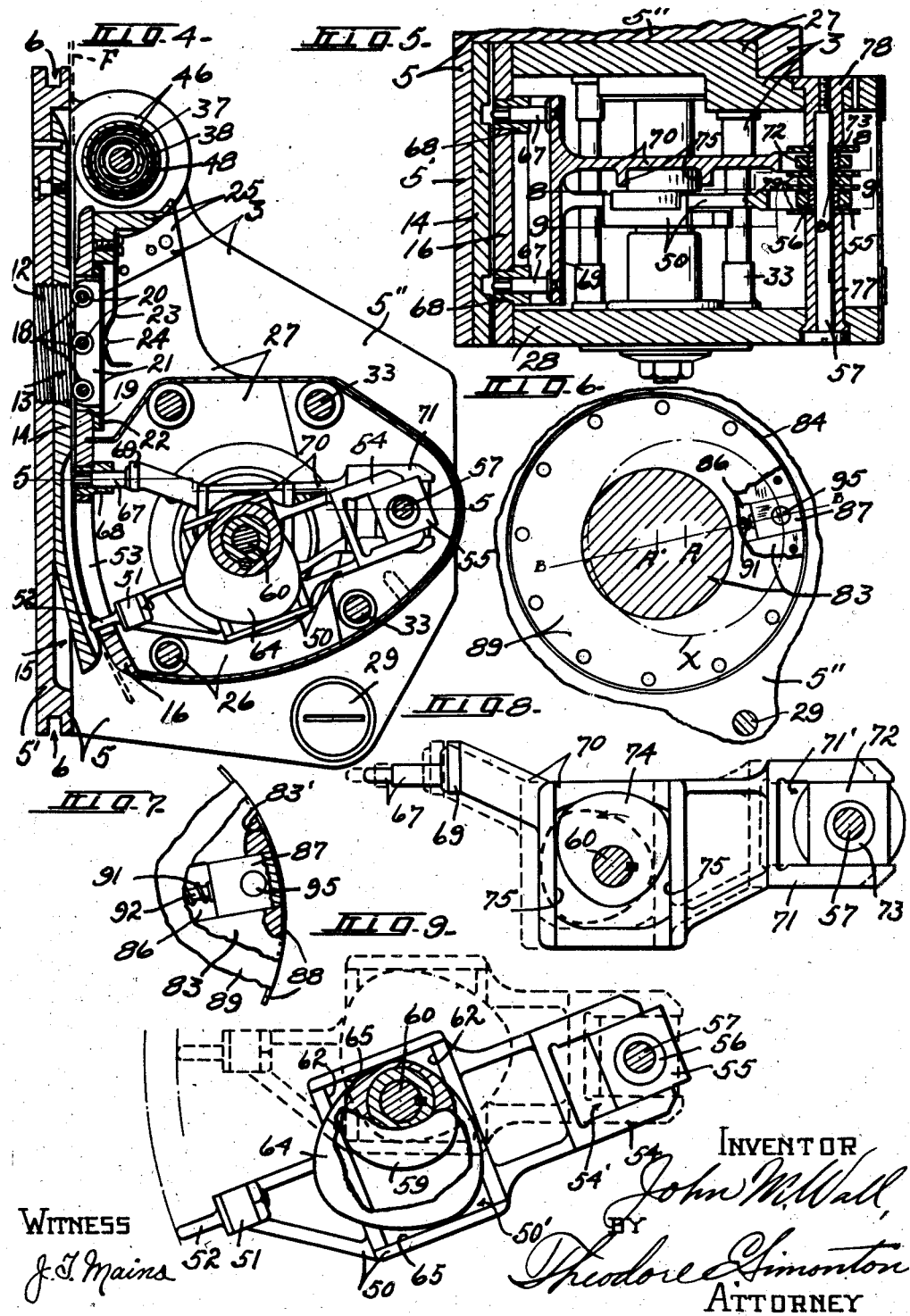

2,144,277

UNITED STATES PATENT OFFICE 2,144,277

INTERMITTENT FILM FEEDING MECHANISM

John M. Wall, Syracuse, N. Y.

Application July 11, 1935, Serial No. 30,865

2 Claims. (Cl. 88—18.4)

This invention relates to new and useful improvements in motion picture machines in which a shutter is operated in synchronism with an intermittent feed mechanism for the film.

The main object of my invention is to provide a motion picture machine wherein the time periods of the exposure of the film are considerably greater than the time periods of the unexposure of said film, thereby producing a motion picture machine which, when used as a camera, is adapted to be successfully operated under more or less subdued light.

Furthermore, with my improved mechanism, pictures may be projected on a screen with less sensible flickering of the picture than has heretofore been possible with the conventionally constructed motion picture projectors.

Another important object of the invention is to construct a mechanism to produce the above mentioned result which is reliable, simple and compact, and that will be especially even and smooth in operation at very high speeds, such as is necessary in the operation of a motion picture camera in taking "ultra speed" pictures.

A more specific object is to construct an intermittent feed mechanism for motion picture machines, the parts of which may be quickly and easily assembled to form a complete unit which is adapted to be readily and securely mounted in the operative position within the case of the machine, or easily removed from said case for the purpose of cleaning, oiling, and so forth.

Other objects and advantages relating to the details of the structure and to the form, relation and operation of the parts thereof will more fully appear from the following description taken in connection with the accompanying drawings wherein:

Figure 1 is a side elevation of an intermittent feed mechanism, partly in section, employing various features of this invention, said mechanism being shown in operative position within the case of a motion picture machine and which case is shown in part with the door removed.

Figure 2 is an enlarged vertical section through the feed transmission mechanism and the adjacent associated parts taken substantially in the plane of the line 2—2, Figure 1.

Figure 3 is a detail sectional view taken on line 3—3, Figure 1.

Figure 4 is a vertical section through the intermittent feed mechanism taken on line 4—4, Figure 2.

Figure 5 is a horizontal section taken on line 5—5, Figure 4.

Figure 6 is a detail vertical sectional view taken on line 6—6, Figure 2, showing the drive connection between the drive shaft and the cam shaft and the relation of the axes of rotation of said shafts.

Figure 7 is an enlarged fragmentary sectional view taken substantially in the plane in which Figure 6 is taken with certain portions thereof broken away and in section.

Figure 8 is a detail vertical section taken on line 8—8, Figure 5, illustrating the movement of one of the cams and the film holding means actuated thereby.

Figure 9 is a vertical sectional view taken on line 9—9, Figure 5, and illustrates the movement of the film moving arm and the cams for actuating said arm.

The device as illustrated in the drawings may be arranged in any suitably constructed case as C which, as shown in part in Figures 1 and 2, is adapted more particularly for a camera and comprises a body portion 1 having the front side thereof open and a cover 2 for closing said open side of the case. The case C is adapted to support my novel intermittent feed mechanism 3 and the drive mechanism therefor, together with a suitable lens arrangement, not shown, and which may be of any well known construction.

The intermittent feed mechanism 3 comprises a supporting frame piece 5 which, as shown more particularly in Figure 5, is L-shaped in horizontal cross section and has the upper and lower edges of one leg as 5' thereof parallel and provided with longitudinally extending grooves 6 adapted to engage respective ribbed plates 7 secured in parallel spaced relation to the inner surface of the front end wall 8 of the case C for removably supporting said frame in the case. The leg 5' of the frame 5 extends transversally in parallelism with the front end wall 8 of the case when the frame piece is assembled in said case and the other leg as 5" of the frame extends rearwardly at right angles to the first mentioned leg and is positioned along side of the rear side wall 9 of the case C.

The frame 5 is provided to support the remaining parts of the intermittent feed mechanism 3 and may, together with said parts, be securely locked in the normal operative position within the case C by means of a vertically disposed latch 10 which has its upper end pivotally secured by a shouldered screw 11 to the rear wall 9 of the case body 1. The lower end of the latch 10 terminates in proximity to the upper edge of the leg 5" of the frame 5 and has the surface thereof adjacent said wall provided with a pendant flange 10' adapted to over-hang the adjacent portion of the frame and thereby prevent the withdrawal of said frame from the ribbed plates 7 and, therefore, from the interior of the case C. It will thus be seen that when it is desired to remove the intermittent feed mechanism from the case, it is only necessary to swing the lower end of the latch 10 out of engagement with the frame 5 whereupon the frame is free to be moved outwardly from the case.

As illustrated more clearly in Figure 4, the forwardly positioned leg 5' of the frame 5 is provided with an exposure aperture 12 arranged in substantially the central portion thereof and which is adapted to align with a similar aperture 13 provided in an aperture plate 14 mounted in a suitable recess 15 provided in the rear face of the forward leg 5' of the frame 5. This aperture plate 14 is a substantially rectangular relatively thin, flat member and is secured to the frame leg 5' by screws or other means. The rear surface of the aperture plate, in this instance, is disposed in a vertical plane except for the lower end portion thereof which is curved somewhat rearwardly or inwardly as shown in Figure 4.

A film guide plate 16 is disposed in substantially a vertical position and in slightly spaced relation to the rear surface of the aperture plate 14 and has the lower end thereof curved rearwardly to correspond to the curvature of the aperture plate 14 for guiding the film F as it is moved vertically downwardly in the space thus formed between the aperture plate and the guide plate.

A plurality of, in this instance, three horizontally disposed pressure rollers 18 are positioned in a substantially rectangular slot or opening 19 provided in the guide plate 16 in alignment with the exposure aperture 13. The rollers 18 are each rotatably mounted upon a respective rod or shaft 20 supported at their outer ends in vertical spaced relation, one above the other, by a vertically disposed pressure frame 21 which is carried by the guide plate 16. The pressure frame 21 is constructed with a rear plate 22 and has a portion of each vertical side thereof extended forwardly into the opening 19 for supportably receiving the shafts 20 in such a manner as to position the rollers 18 in close relation to the rear vertical face of the aperture plate 14. The pressure rollers 18 may be yieldingly held in their operative position in the opening 19 against the film F as said film is being moved vertically downwardly by means of, in this instance, a vertically disposed flat pressure spring 23 which has its upper end secured by a screw or other suitable means to the rear face of a horizontally disposed bracket 25 secured to the upper end of a carrier frame 26 with the lower end of said spring engaging the rear plate 22 of the pressure frame between a pair of guide pins 24 secured to the plate.

The carrier frame 26, in this instance, consists of two spaced side plates 27 and 28. The rear side plate as 27 is disposed in a vertical plane adjacent the rearwardly extending leg 5" of the frame 5 and is pivotally secured thereto by a suitable shouldered stud or screw 29 which extends through a hole provided in the inner side plate in the inner lower portion thereof and is securely clamped to the adjacent portion of the frame 5 by a nut 30 screw threaded on the stud and positioned in a suitable recess provided in the inner face of said frame. A bushing as 31 may, as shown in Figure 2, be mounted in the side plate 27 for the reception of the stud 29.

The other or outer side plate 28 of the carrier frame 26 is constructed similarly to the lower portion of the plate 27 and is secured in parallel spaced relation thereto by a plurality of, in this instance, four suitably arranged spacing studs 33 which, as indicated in the lower part of Figure 2, have their inner ends screw threaded in the side plate 27 and their outer ends secured to the side plate 28 by screws 34.

The hereinbefore mentioned bracket 25 is secured by any suitable means to the side plate 27 near the upper end thereof and extends outwardly from said plate to substantially the vertical plane of the side plate 28 and has its outer end constructed to form a vertically disposed upwardly extending flange 25' arranged in the plane of the front side plate 28. The flange 25' and plate 28 are spaced from the inner side plate 27 a distance slightly greater than the width of the film to be used and form a support for the guide plate 16 which is secured to the front vertical edges of said bracket and the front and rear side plates by screws 35 and dowel pins 36. The carrier frame 26 and the film guide plate 16 are locked against pivotal movement in their normal operative position with the guide plate in slightly spaced relation to the aperture plate 14 by a horizontally disposed lock rod 37 which, in this instance, is journaled in a tubular film guide supporting sleeve 38 carried by the upper end of the carrier frame 26 as shown in Figure 2. The outer end of the lock rod 37 extends a short distance beyond the bracket 25 and has a knurled knob 39 secured thereto to limit the inward movement of said lock rod and to also form a convenient means by which the rod may be rotated.

The inner end of the lock rod 37 extends beyond the inner side plate 27 into a recess 40 provided in the leg 5" of the frame 5. A bushing or collar 41 is mounted in the upper end of the leg 5" of the frame 5 in alignment with the interior of the tubular sleeve 38 and which is adapted to receive the inner end of the lock rod 37 therethrough. This collar 41 has the face thereof adjacent the recess 40 provided with a pair of diametrically opposed lugs 41' which have the outer face thereof tapered and adapted to be engaged by a pair of diametrically opposed laterally disposed lugs 42 formed on the inner reduced end of the lock rod 37 in a plane adjacent the tapered face of the lugs 41'. The inner face of the lugs 42 are reversibly tapered to the outer face of the lugs 41' so that by rotating the rod, the lugs 42 will engage the tapered edge of the lugs 41' and thereby draw the lock rod 37 inwardly and clamp the carrier frame 26 to the supporting frame 5.

It will be understood that the diameter of the lugs 42 is substantially equal to or slightly less than that of the inner opening in the collar 41 so that when the lugs 42 are positioned by the rotation of the lock rod 37 in parallel relation with the lugs 41' out of engagement with said latter lugs, the lugs 42 may freely pass through the collar 41 and thereby permit the lock rod to be disengaged from the frame 5 by the outward axial movement thereof.

The sleeve 38 is clamped in the carrier frame 26 by means of an outwardly extending annular flange 37' provided on the inner end of said sleeve and which is positioned in a suitable recess provided in the outer face of the inner side plate 27 and a nut 44 screw threaded on the outer end of the sleeve adjacent the flange 25' of the bracket 26 and which may, as shown, be positioned in a suitable recess provided in the outer face of said flange.

A suitable film guide 46, positioned at the upper end of the guide plate 16, is journaled in any suitable manner as upon ball bearings 47 which are carried by a tubular supporting member 48 mounted upon the sleeve 38 between the inner face of the flange 25' and the inner side plate 27.

The film F is intermittently moved downwardly between the aperture plate 14 and the guide plate 19 by an arm 50 positioned intermediate the rear and front side plates 27 and 28 at the rear of the lower curved portion of the film guide plate 16. This arm 50 is provided with a cross head 51 at its forward end and a pair of forwardly extending film moving pins 52 are secured to the cross head 51 and spaced apart a distance equal to the distance between the rows of perforations usually provided near each longitudinal edge of the film. The pins 52 extend through respective longitudinal slots 53 provided in the guide plate 16 adjacent the lower end thereof, whereby the pins may be moved into and out of engagement with the perforations in the film. The arm 50 extends rearwardly from the guide plate 16 and has its rear end 54 recessed as at 54' and slidably mounted on a guide member 55 which is rotatably mounted upon a bushing or collar 56 which, in turn, is mounted upon a horizontally disposed screw or rod 57. The depth of the recess 54' is such as to permit sufficient longitudinal movement of the arm 50 to bring the pins 52 into and out of operative engagement with the film F.

This longitudinal movement of the arm 50 is produced in this instance, by means of a cam member 59 which is secured to a horizontally disposed cam shaft 60 journaled in suitable ball bearings 61 mounted in each of the side plates 27 and 28. The cam 59 operates in a rectangular opening 50' provided in the arm 50 intermediate the ends thereof so that the rotation of the cam causes the arm to reciprocate longitudinally by the engagement thereof with spaced parallel walls 62 of the opening 50' arranged in transverse relation to the longitudinal axis of said arm.

The arm 50 is caused to oscillate about the axis of the guide member or block 55 by means of a cam 64 which, in this instance, is securely mounted upon the hub of the cam member 59 so as to rotate therewith. The cam 64 operates between two parallel spaced walls 65 provided on the arm 50 in parallel relation with the longitudinal axis of said arm at the upper and lower sides of the opening 50'.

The cams 59 and 64 and the walls or surfaces 62 and 65 are so designed and proportioned that as the arm approaches its uppermost position as illustrated by broken lines in Figure 9 by the action of the cam 64, said arm will be moved forwardly by the action of the cam 59 in nearly a straight line extending through the pins 52 normal to the adjacent portion of the film F to bring said pins into cooperative re-engagement with the film apertures. As the pins 52 are thus engaged with the film, the cam 59 functions to maintain the pins in engagement with the film, while the cam 64 effects the downward swinging movement of the pins and arm 50 a sufficient distance to move the film one picture frame space past the exposure aperture 13 so as to bring the next succeeding picture frame into registration with said aperture after which the arm 50 is moved rearwardly by the action of the cam 59 sufficiently to bring the pins 52 out of operative engagement with the film apertures after which the arm and pins are returned to their uppermost position by the action of the cam 64 with the pins 52 maintained at the rear of the film by the cam 59.

The film F is locked or securely held against longitudinal movement during the time the pins 52 are disengaged from the film by means of a pair of pins 67 which are positioned in respective guide members 68 secured in any suitable manner in the guide plate 16 in a plane above and in alignment with respective slots 53 to permit said pins to be moved into holding engagement with the film by the entrance thereof into corresponding film perforations aligned with said guide members. The pins 67 are carried by a cross head 69 formed on the forward end of an arm 70 and are spaced apart a distance equal to the distance between the rows of perforations on the film. The rear end 71 of the arm 70 is provided with a recess 71' which slidably receives a guide member or block 72 mounted upon a collar or bushing 73 which, in turn, is mounted upon the screw or rod 57. The length of the opening 71' is such as to permit sufficient longitudinal movement of the arm 70 to bring the pins 67 into and out of cooperative relation with the film F.

The arm 70 is reciprocated for effecting the movement of the pins 67 by a cam 74 secured to the cam shaft 60 at the rear of the cams 59 and 64 as shown in Figure 2. This cam 74 operatively engages a pair of parallel spaced walls 75 provided on the arm 70 in substantially transverse relation to the longitudinal axis of the arm. The cam 74 and the flange members or walls 75 are so designed that the pin 67 will be moved into and out of engagement with the film in proper synchronism with the action of pins 52 to positively hold the film against movement when it is not being moved by the pins 52. In other words, as the arm 50 is moved outwardly from its inner and uppermost position as illustrated by broken lines in Figure 9, to bring the pins 52 into cooperative engagement with the film, the cam 74 will function to move the arm 70 from the position illustrated by broken lines in Figure 8 to the position illustrated by full lines in said figure where the pins 67 are maintained out of holding engagement with the film during the downward movement of the arm 50. As the arm 50 approaches its lowermost position as illustrated by full lines in Figure 9, the cam 74 will again act to move the arm 70 forwardly to bring the pins 67 carried thereby into holding engagement with the film and at the same time the arm 50 will be moved rearwardly by the action of the cam 59 to bring the pins 52 out of engagement with the film and then cooperates with cam 64 to return said arm and pins to their uppermost position as illustrated by broken lines in Figure 9.

As illustrated more clearly in Figure 5, the screw or rod 57 extends inwardly through a spacing sleeve 77 mounted in the outer side plate 28 and has the inner end thereof secured as by threads to a spacing sleeve 78 mounted in the inner side plate 27. Washers 79 are provided on the screw 57 at each end of the bushings 56, while a spacing sleeve or collar 80 is mounted on said screw intermediate the washers 79 provided at the inner or adjacent ends of the bushings 56. It will thus be seen that the bushings 56 and 73, washers 79 and spacing member 80 are clamped to the rod 57 in cooperative alignment with the respective arms 50 and 70 by the cooperation of the screw 57 and spacing sleeves 77 and 78.

The cam shaft 60 extends in a horizontal plane through the opening 50' provided in the arm 50 and through a similar opening 70' provided in the arm 70, and is provided at its inner end with an enlarged flange or head 83 which is positioned in suitable apertures 84 and 85 provided respectively in the leg 5'' of the frame 5 and the rear side plate 27 of the carrier frame 26; see Figure 2. The head 83 is provided with a radially disposed slot 86 which extends inwardly from the peripheral face thereof toward the axis of the shaft 60, for the reception of a drive block 87 which is slidably mounted in said slot. The block is maintained in the slot 86 against outward movement by means of a wire ring 88 which extends about the periphery of the plate 83 in a groove 83' provided in the periphery of the plate 83 intermediate the sides thereof.

A pair of cover plates 89 and 90 are secured one to either side of the head 83 and extend across the slot 86 for maintaining the drive block 87 against lateral displacement from said slot. The drive block is urged outwardly by means of a spring 91 which has the outer end thereof coiled about a retaining pin 92 secured to the drive block 87 and the inner end of the spring is positioned in an aperture 93 which extends inwardly from the inner end of the slot 86 as shown more clearly in Figure 2.

A drive pin 95 has one end removably journaled in the drive block 87 and extends outwardly therefrom through a radially disposed elongated slot 90' provided in the cover plate 90 and has the outer end thereof securely mounted in an annular flange or head member 96 secured to or made integral with the inner end of a drive shaft 97 whereby a rotary motion is transmitted from the drive shaft to the cam shaft 60, see Figure 2.

The drive shaft 97 is disposed in a horizontal plane in eccentric relation with the cam shaft 60 and is journaled in a pair of suitably spaced ball bearings 98 carried in the adjacent portion of the camera case C. The outer end of the drive shaft 97 extends a short distance beyond the case C and has secured thereto a balance wheel 99. As previously stated, the drive shaft 97 is mounted in eccentric relation to the cam shaft 60 and as shown more clearly in Figure 6, the shafts are preferably so arranged that the axis of rotation A of the drive shaft is positioned at the rear of the axis of rotation A' of the cam shaft 60 and in a plane slightly above the horizontal plane passing through the axis of the cam shaft. In other words, the drive shaft 97 is so positioned relative to the cam shaft 60 that the axis of said drive shaft will lie in the diametrical plane which passes through the axis of the cam shaft substantially normal to the lower curved portion of the film guide plate 16 substantially mid-way between the ends of the slots 53.

It will now be understood that due to the eccentric relation of the drive shaft 97 with the cam shaft 60, the drive pin 95 will travel in a path eccentric to the axis of the cam shaft 60 as indicated by the dot and dash line X, Figure 6, and although the drive pin 95 is driven at a constant speed, the cam shaft will be driven thereby at a variable speed of rotation depending, of course, upon the degree of eccentricity of the drive and cam shafts. Inasmuch as the axes of these shafts lie in the plane passing substantially midway between the ends of the slots 53 normal to the curvature thereof, it follows that the maximum and minimum speeds of operation of the cam shaft will be produced as the drive pin passes through said diametrical plane at opposite sides of the shaft 97. It will thus be seen that as the drive pins 52 are moved downwardly to effect the longitudinal movement of the film, these pins will be operated at maximum speed and when the pins are being moved upwardly out of engagement with the film, they will be operated at a minimum speed, thus decreasing the period of time consumed in effecting the longitudinal movement of the film and increasing the period of time the film remains at rest with a picture frame thereof in registration with the exposure apertures 12 and 13 and, therefore, with the photographic lens associated with said apertures.

The drive shaft 97 is shown provided with the usual worm gear 100 which may be secured thereto in any suitable manner and is in meshing engagement with a worm 101 mounted on the shutter shaft 102 for operatively connecting said shafts. This shaft 102 extends longitudinally through the case C at the rear of the film chamber c of the case as is usual in this class of instruments and is journaled in suitable axially spaced bearings not shown mounted in the body 1 in any well known manner.

It will now be readily understood that while the drive shaft 97 and the shutter shaft 102 are operated at a uniform constant rate of speed in the conventional manner as by a motor (not shown) operatively connected with the shutter shaft, the film F will be maintained in the at rest position with a picture frame thereof in registration with the exposure apertures 12 and 13 during a longer period of time than has been possible in the heretofore conventionally constructed moving picture machine due to the eccentric relation of the drive shaft 97 with the cam shaft 60, as hereinbefore described which enables the photographing of objects or scenery in a much more subdued light and without the necessity of varying the normal speed of operation of the machine, than has heretofore been possible to accomplish with the conventionally constructed cameras.

Furthermore, it will be observed that inasmuch as the film guide plates 14 and 16, shaft 60, film feeding and holding arms 50 and 70 and the mechanism operatively connecting said arms with the shaft 60 are all mounted upon the frame 5, this intermittent feed mechanism may be quickly and easily removed from or placed into the case C by sliding the frame along plates 7 and by the proper manipulation of the latch 10, as will be readily understood. When the intermittent feed mechanism 3 is being removed from the case C, the shaft 60 will obviously move with the frame 5 and thereby draw the drive block 87 from the drive pin 95 irrespective of the position of said block and pin with respect to the path of travel of the drive pin. As soon, however, as the drive block 87 is moved from the drive pin 95, the spring 91 will urge the block to its outermost position in contact with the wire retaining or stop ring 88.

It therefore follows that in order to readily again assemble the drive block 87 on the drive pin 95 in operative relation therewith, the drive pin 95 must be in the position illustrated in Figure 6 most remote from the shaft 60, to which position it may be moved by rotating shaft 97 as through the medium of the balance wheel 99; that is, shaft 97 is rotated until the drive pin 95 is at the opposite side of shaft 60 from slot 53 with the axis thereof arranged substantially in the plane B—B passing through the axes A—A' of shafts 97 and 60 respectively, whereupon the drive pin will be in alignment with the path of travel of the hole in the drive block 87 when said drive block is in its outermost position in slot 86. The block 87 may be moved into alignment with the pin 95 by the operator manually rotating shaft 60 by engagement with the outer end thereof in the same manner in which said shaft is rotated to bring the pins 52 and 67 of the film operating and holding arms 50 and 70 into operative relation with the film perforations during the threading of the film between the plates 14 and 16. It therefore follows that when the aperture in the drive block 87 and the drive pin 95 are thus aligned with each other the film feeding unit may be quickly and easily mounted in the case C to bring the exposure aperture 12 in the frame 5 into alignment with the usual exposure aperture provided in the case C.

Although I have shown and particularly described the preferred form of my invention, I do not wish to be limited to the exact details set forth as various changes may readily be made without departing from the spirit of the invention as set forth in the appended claims.

I claim:

1. In an intermittent feeding mechanism wherein a film operating unit is mounted for movement toward and from an exposure aperture, the combination with said unit of a variable speed drive means comprising driving and driven elements mounted to rotate about axes extending in spaced substantially parallel relation with each other when the film operating unit is adjacent the exposure aperture, coacting means operatively connecting said driving and driven elements including a member fixedly connected with one of the elements in eccentric relation therewith and a second member connected with the other element in eccentric relation therewith to move relative to the axis of rotation thereof, said members of the connecting means being adapted to move into and out of engagement with each other during said movement of the operating unit, means for rotating the drive element at a substantially uniform rate of speed, and means associated with the movable member of the coacting means for yieldingly urging the same to a predetermined position whereby the members will readily engage each other during the movement of the film operating unit toward the exposure aperture.

2. In an intermittent feed mechanism of the class wherein a film operating unit is mounted for movement toward and from an exposure aperture, a variable speed drive means for said unit comprising a cam shaft rotatably connected with the film operating unit to move therewith, a drive shaft mounted to rotate about an axis extending in spaced substantially parallel relation with the axis of rotation of said cam shaft when the operating unit is adjacent the exposure aperture, coacting means releasably connecting said shafts to each other so constructed and arranged that when the operating unit is adjacent the exposure aperture the cam shaft will be driven at a variable rate of speed by the drive shaft when said latter shaft is being operated at a substantially uniform rate of speed, said coacting means including a drive pin secured to one of the shafts in eccentric relation therewith, and an apertured block adapted to removably receive the drive pin therein operatively connected with the other shaft for movement relative to the axis of rotation thereof, and means including a spring and a stop element connected with the block and the pertinent shaft to yieldingly maintain the block in a predeterminate position when the pin is disengaged therefrom by movement of the unit away from the exposure aperture whereby said pin and block may readily be brought into cooperative relation with each other as the unit is again moved toward the exposure aperture.

JOHN M. WALL.